(12) United States Patent
Fujishiro

(10) Patent No.: US 9,402,197 B2
(45) Date of Patent: Jul. 26, 2016

(54) MEASUREMENT COLLECTION METHOD, BASE STATION, AND RADIO TERMINAL

(75) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 125 days.

(21) Appl. No.: 14/112,451

(22) PCT Filed: Apr. 6, 2012

(86) PCT No.: PCT/JP2012/059444
§ 371 (c)(1),
(2), (4) Date: Oct. 17, 2013

(87) PCT Pub. No.: WO2012/144338
PCT Pub. Date: Oct. 26, 2012

(65) Prior Publication Data
US 2014/0044002 A1 Feb. 13, 2014

(30) Foreign Application Priority Data
Apr. 18, 2011 (JP) ................................. 2011-092512

(51) Int. Cl.
H04W 24/08 (2009.01)
H04W 24/10 (2009.01)

(52) U.S. Cl.
CPC .............. *H04W 24/08* (2013.01); *H04W 24/10* (2013.01)

(58) Field of Classification Search
CPC ..... H04W 24/08; H04W 24/10; H04W 24/00; H04W 8/16; H04W 8/24; H04W 16/18; H04W 76/046
USPC ................ 370/252; 455/423, 424, 425, 67.11
See application file for complete search history.

(56) References Cited

U.S. PATENT DOCUMENTS 6,455,917 B1\* 9/2002 Kuroki .................... H01L 28/84
257/309
8,838,091 B2\* 9/2014 Jung ...................... H04W 24/10
455/423

(Continued)

FOREIGN PATENT DOCUMENTS

CN 101365223 A 2/2009
CN 101931984 A 12/2010

(Continued)

OTHER PUBLICATIONS

3GPP TSG-SA5 (Telecom Management), Meeting SA5#75,Jan. 24-28, 2011, Sorrento, Italy, S5-110521.

(Continued)

*Primary Examiner* — Andrew Chriss
*Assistant Examiner* — Rasha Fayed
(74) *Attorney, Agent, or Firm* — Studebaker & Brackett PC

(57) ABSTRACT

A measurement collection method used in a mobile communication system, comprises: a base station includes unnecessary area information, which indicates a measurement unnecessary area requiring no measurement data, into a configuration message as one of a parameter, and transmits the configuration message to a radio terminal; and the radio terminal excludes measurement data, which corresponds to the measurement unnecessary area indicated by the unnecessary area information, from a report object to the network, or stops measurement in the measurement unnecessary area and reports measurement data including a measurement result, other than that in the measurement unnecessary area, to the network.

5 Claims, 12 Drawing Sheets

(56) References Cited

U.S. PATENT DOCUMENTS

| | | | | |
|---|---|---|---|---|
| 2006/0128371 A1* | 6/2006 | Dillon | ................... | H04W 24/00 455/423 |
| 2010/0197239 A1* | 8/2010 | Catovic | ................ | H04W 24/08 455/67.11 |
| 2010/0317347 A1* | 12/2010 | Burbidge | .......... | H04W 36/0094 455/436 |
| 2010/0325232 A1* | 12/2010 | Zhang | .................... | H04H 20/57 709/206 |
| 2011/0269402 A1* | 11/2011 | Yi | ........................ | H04W 24/08 455/67.11 |
| 2013/0035115 A1* | 2/2013 | Lindegren | ............. | H04W 28/22 455/456.3 |

FOREIGN PATENT DOCUMENTS

| | | | |
|---|---|---|---|
| JP | 2008306240 A | * | 12/2008 |
| WO | 2010090179 A1 | | 8/2010 |

OTHER PUBLICATIONS

3GPP TS 37.320 v10.1.0 (Mar. 2011) Technical Specification; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

3GPP TS 37.320 v10.0.0 (Dec. 2010) Technical Specification; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

3GPP TR 36.805 v9.0.0 (Dec. 2009) Technical Report; 3rd Generation Partnership Project; Technical Specification Group Radio Access Network; Study on Minimization of drive-tests in Next Generation Networks; (Release 9).

Written Opinion for PCT/JP2012/059444 mailed Jun. 12, 2012.

International Search Report for PCT/JP2012/059444 mailed Jun. 12, 2012.

The extended European search report issued by the European Patent Office on Apr. 10, 2015, which corresponds to European Patent Application No. 12773943.1-1854 and is related to U.S. Appl. No. 14/112,451.

Communication pursuant to Rules 70(2) and 70a(2) EPC issued by the European Patent Office on Apr. 29, 2015, which corresponds to European Patent Application No. 12773943.1-1854 and is related to U.S. Appl. No. 14/112,451.

The First Office Action issued by the Chinese Patent Office on Dec. 22, 2015, which corresponds to Chinese Patent Application No. 201280018975.6 and is related to U.S. Appl. No. 14/112,451; with English anguage concise explanation.

* cited by examiner

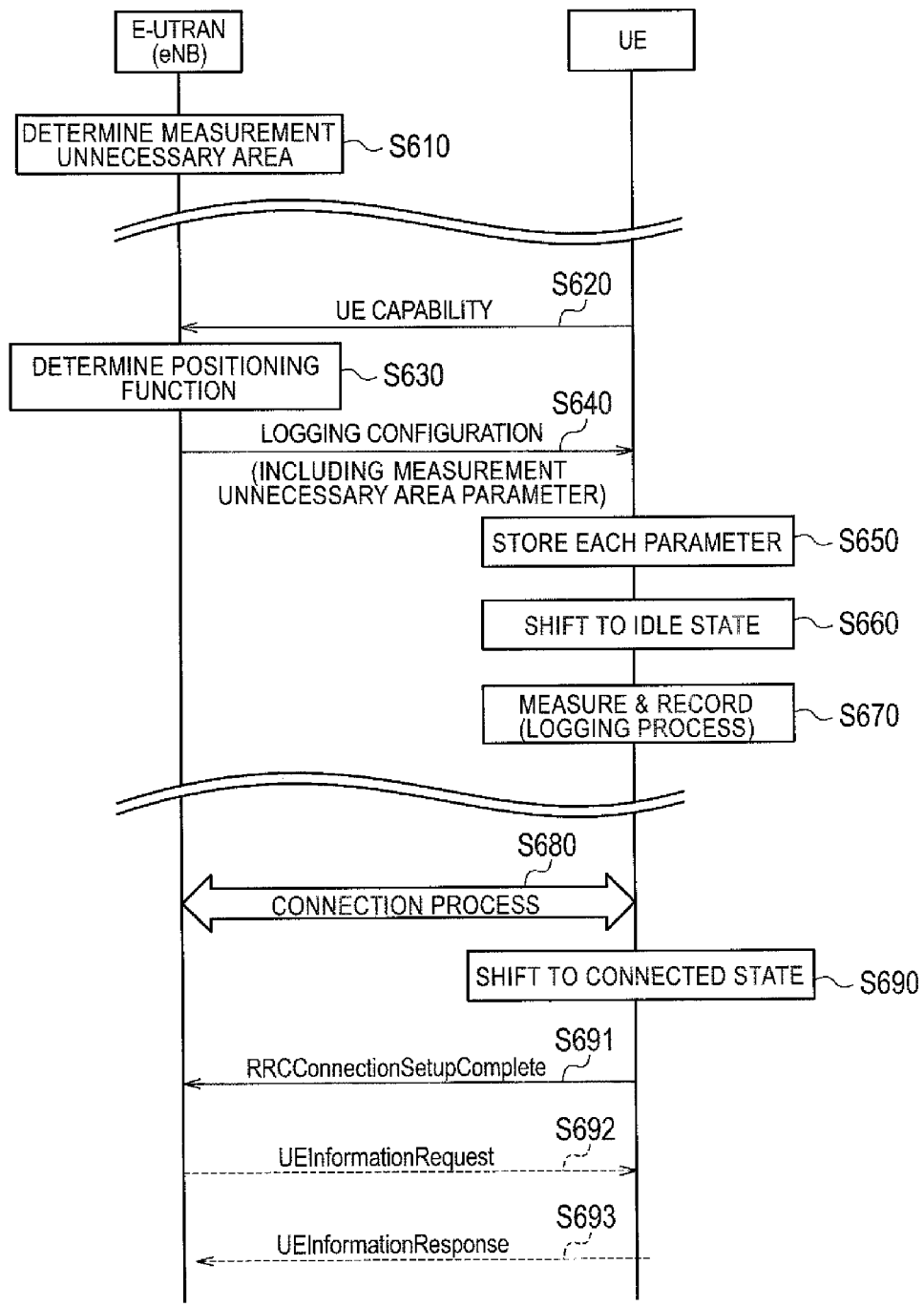

MEASUREMENT COLLECTION METHOD, BASE STATION, AND RADIO TERMINAL

TECHNICAL FIELD

The present invention relates to a measurement collection method used in MDT, a base station therefor, and a radio terminal therefor.

BACKGROUND ART

In a mobile communication system, if a building is built in the vicinity of a base station, or if the installation status of a base station in the vicinity of the base station changes, the radio environment related to the base station changes. Therefore, conventionally, an operator performs a drive test of measuring a radio environment by using a measurement vehicle provided with a measurement equipment, and collecting a measurement result and location information at the time of the measurement.

Such a method, for example, may contribute to the optimization of the coverage of a base station, but faces the problem of too many man-hours and high cost. In this regard, according to 3GPP (3rd Generation Partnership Project) which is a project aiming to standardize a mobile communication system, a radio terminal owned by a user is used to proceed with the specification design of MDT (Minimization of Drive Test) which is a technology for automation of the measurement and collection (refer to Non Patent Literatures 1 and 2).

As a type of the MDT, there is an immediate report-type MDT (hereinafter, appropriately referred to as "Immediate MDT"). According to the Immediate MDT, a radio terminal in a connected state (a connected mode) performs measurement according to a parameter set from a network, and reports a measurement result and location information to the network. Furthermore, the connected state indicates the state in which the radio terminal performs communication.

Furthermore, as a type of the MDT, there is a record-type MDT (hereinafter, appropriately referred to as "Logged MDT"). According to the Logged MDT, a radio terminal in an idle state (an idle mode) performs measurement of a radio environment according to a parameter (a measurement condition) set from the network, records a measurement result as measurement data together with location information (and time information), and reports the measured measurement data to the network later. Furthermore, the idle state indicates the state (for example, during standby) in which the radio terminal interrupts communication.

In the MDT, since a plurality of radio terminals perform measurement under various conditions, it is considered that measurement data important for the network and unimportant measurement data coexist.

However, in the MDT, since the radio terminal records a measurement result as measurement data and reports all types of obtained measurement data to the network in all cases in which a radio environment or the state of the radio terminal satisfies the measurement condition, it is probable that the network (that is, an operator) is not able to sufficiently collect important measurement data. Furthermore, when a large amount of unimportant information is included, it is also probable that the network recognizes a problem other than a true problem as an important problem and performs inappropriate optimization.

PRIOR ART DOCUMENT

Non-Patent Document

Non-Patent Document 1: 3GPP TR 36.805 V9.0.0: "Study on Minimization of drive-tests in Next Generation Networks", 2009-12

Non-Patent Document 2: 3GPP TS 37.320 V10.0.0: "Radio measurement collection for Minimization of drive tests (MDT); Overall description; Stage 2", 2010-12

SUMMARY OF THE INVENTION

A first aspect of a measurement collection method according to the present invention is summarized as a measurement collection method used in a mobile communication system (a mobile communication system 1), comprising: a step of transmitting, by a base station (a base station eNB), a configuration message including a parameter related to measurement of a radio environment to a radio terminal (a radio terminal UE); and a step of performing, by the radio terminal, measurement of the radio environment according to the parameter included in the configuration message received from the base station, and reporting measurement data including a result of the measurement and location information at the time of the measurement to a network (the E-UTRAN 10) including the base station, wherein the base station includes unnecessary area information, which indicates a measurement unnecessary area requiring no measurement data, into the configuration message as one of the parameter, and transmits the configuration message, and the radio terminal excludes measurement data, which corresponds to the measurement unnecessary area indicated by the unnecessary area information, from a report object to the network, or stops measurement in the measurement unnecessary area and reports measurement data including a measurement result, other than that in the measurement unnecessary area, to the network.

According to such a characteristic, it is possible to provide that a measurement unnecessary area is designated at the network side and measurement data corresponding to the measurement unnecessary area is not reported to the network from the radio terminal, so that it is possible to prevent the network (that is, an operator) from collecting unnecessary (unimportant) measurement data. Furthermore, the unimportant measurement data is prevented from being collected, so that it is possible to reduce the probability to cause inappropriate optimization.

Another aspect of the measurement collection method according to the present invention in the above aspect is summarized as the measurement collection method further comprising: a step of determining, by the base station or an upper device (an operation-administration-maintenance device OAM) of the base station, the measurement unnecessary area on the basis of measurement data collected in the past.

The other aspect of the measurement collection method according to the present invention in the above aspect is summarized as the base station includes target area information, which indicates a measurement target area requiring measurement data, into the configuration message as one of the parameter, in addition to the unnecessary area information, and transmits the configuration message, and the unnecessary area information indicates the measurement unnecessary area in the measurement target area.

The other aspect of the measurement collection method according to the present invention in the above aspect is summarized as the base station includes the unnecessary area information, in which the measurement unnecessary area has been designated with a coordinate, into the configuration message, and transmits the configuration message to the radio terminal having a position function (a GPS receiver 230).

The other aspect of the measurement collection method according to the present invention in the above aspect is summarized as a base station (a base station eNB) of a mobile communication system (a mobile communication system 1), comprising: a transmission unit (a radio communication unit 110 and a control unit 140) that transmits a configuration message including a parameter related to measurement of a radio environment to a radio terminal (a radio terminal UE), wherein the transmission unit includes unnecessary area information into the configuration message as one of the parameter, and transmits the configuration message, the unnecessary area information indicating a measurement unnecessary area requiring no measurement data including a result of measurement and location information at the time of the measurement.

The other aspect of the measurement collection method according to the present invention in the above aspect is summarized as a radio terminal (a radio terminal UE) of a mobile communication system (a mobile communication system 1), comprising: a reception unit (a radio communication unit 210) that receives a configuration message including a parameter related to measurement of a radio environment from a base station (a base station eNB); and a control unit (a control unit 250) that controls so that the radio environment is measured according to the parameter included in the configuration message received in the reception unit, and measurement data including a result of the measurement and location information at the time of the measurement is reported to a network (the E-UTRAN 10) including the base station, wherein the parameter includes unnecessary area information indicating a measurement unnecessary area requiring no measurement data, and the control unit controls so that measurement data, which corresponds to the measurement unnecessary area indicated by the unnecessary area information, is excluded from a report object to the network, or controls so that measurement is stopped in the measurement unnecessary area and measurement data including a measurement result, other than that in the measurement unnecessary area, is reported to the network.

BRIEF DESCRIPTION OF THE DRAWINGS

FIG. 15 is an operation sequence diagram of a mobile communication system according to a second modification of the second embodiment.

DESCRIPTION OF THE EMBODIMENT

Figure 1:
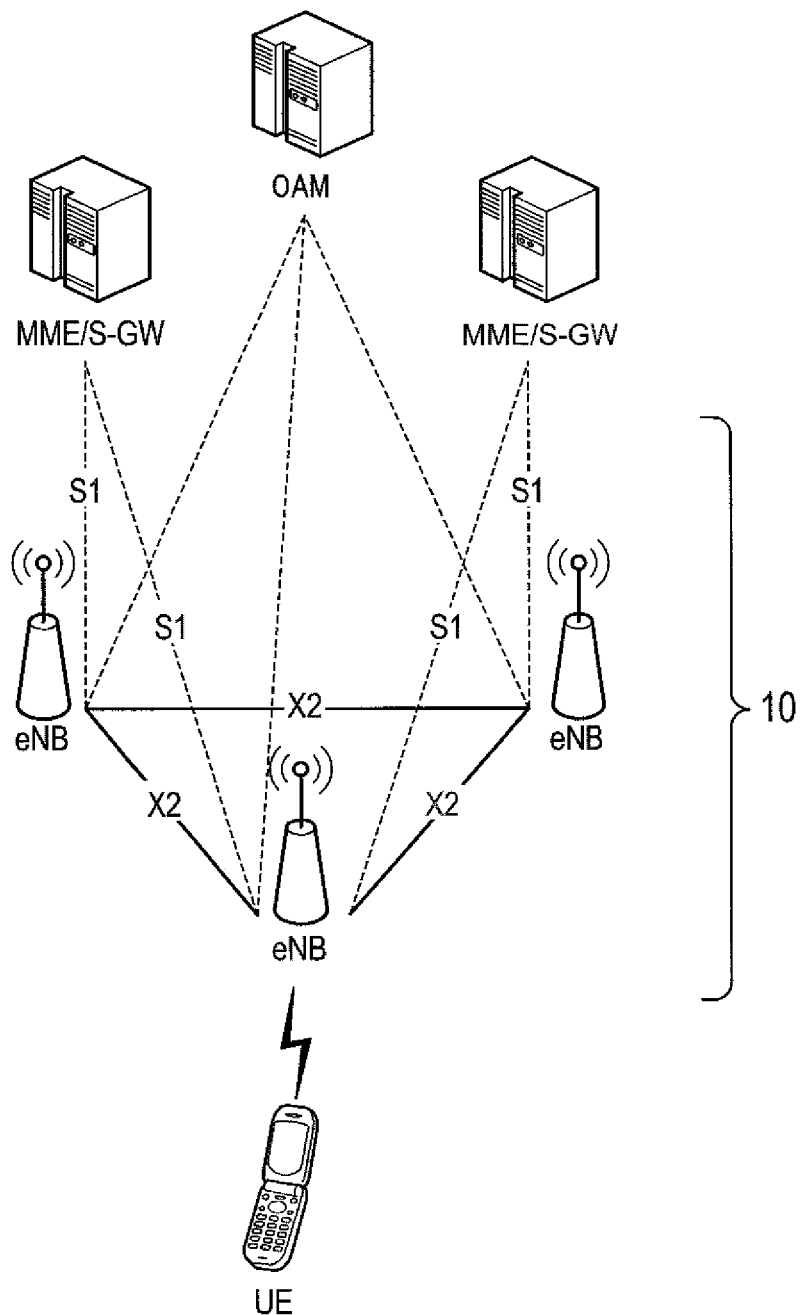
FIG. 1 is an entire schematic configuration diagram of a mobile communication system 1 according to a first embodiment and a second embodiment.

A first embodiment, a second embodiment, and other embodiments of the present invention are explained below with reference to drawings. In the following embodiments, through the drawings, same or similar components are assigned the same or similar reference numerals.

First Embodiment

FIG. 1 is an entire schematic configuration diagram of a mobile communication system 1 according to the present embodiment. The mobile communication system 1 according to the present embodiment is configured on the basis of LTE (Long Term Evolution), specifications of which are designed in 3GPP, and supports the aforementioned Immediate MDT.

As illustrated in FIG. 1, the mobile communication system 1 includes a radio terminal UE, E-UTRAN (Evolved-UMTS Terrestrial Radio Access Network) 10 that is a radio access network, a mobility management device MME/a gateway device S-GW, and an operation-administration-maintenance device OAM. The E-UTRAN 10 includes a plurality of base stations eNB.

The radio terminal UE is a transportable radio communication device belonging to a user. The radio terminal UE is configured to connect to one of the base stations eNB constituting the E-UTRAN 10 (including a case of connecting thereto via a relay device, or connecting to a relay device), and enable communication with a communication destination via the base station eNB. As described above, the state in which the radio terminal UE is performing communication will be referred to as a connected state (a connected mode), and the state in which the radio terminal UE is standing by will be referred to an idle state (an idle mode).

Each base station eNB is a fixed radio communication device set up by an operator, and is configured to perform radio communication with the radio terminal UE. Each base station eNB always transmits a reference signal in a broadcast manner, wherein the reference signal is a radio signal configured to identify the base station eNB (the cell of the base station eNB). Furthermore, each base station eNB performs communication with the mobility management device MME/the gateway device S-GW and communication with the operation-administration-maintenance device OAM via a backhaul.

The mobile management device MME is configured to perform various mobility controls for the radio terminal UE, and the gateway device S-GW is configured to perform transfer control of user data transmitted and received by the radio terminal UE.

The operation-administration-maintenance device OAM is a server device set up by an operator, and is configured to perform operation, administration, and maintenance of the E-UTRAN 10.

In the present embodiment, the base station eNB, which is a connection destination of the radio terminal UE, for example, transmits Measurement Configuration (a configuration message) to the radio terminal UE in response to an instruction from the operation-administration-maintenance device OAM, wherein the Measurement Configuration is a message for configuring the Immediate MDT in the radio terminal UE. The Measurement Configuration includes a plurality of configuration parameters (configuration parameters). The plurality of configuration parameters include a parameter for designating a base station eNB (a cell) that is a measurement object, and a report trigger parameter that is a parameter for designating a condition (a trigger) in which measurement data is to be reported to the E-UTRAN 10. The condition (the trigger) to be reported, for example, is a periodic trigger, a trigger indicating that RSRP/RSRQ from a serving cell has become less than a threshold value, and the like.

The radio terminal UE set to perform the Immediate MDT measures a radio environment (specifically, reference signal received power (RSRP)/reference signal received quality (RSRQ)) in a connected state for each base station eNB (each cell), and acquires location information at the time of the measurement. Then, when a report condition designated by the report trigger parameter has been satisfied, the radio terminal UE reports measurement data including information on a result of the measurement and the location information to the E-UTRAN 10. In addition, the location information indicates GPS/GNSS location information when the radio terminal UE has a GPS/GNSS function, and indicates RF fingerprint information when the radio terminal UE has no GPS reception function.

In the present embodiment, the plurality of configuration parameters included in the Measurement Configuration include measurement unnecessary area parameters that are parameters for designating a measurement unnecessary area that requires no measurement data. Even when the report condition designated by the report trigger parameter has been satisfied, it is assumed that the radio terminal UE does not report, to the E-UTRAN 10, measurement data obtained in the measurement unnecessary area designated by the measurement unnecessary area parameters.

The base station eNB having received measurement data from the radio terminal UE transfers the received measurement data to the operation-administration-maintenance device OAM. If the operation-administration-maintenance device OAM discovers a coverage problem on the basis of the measurement data acquired in this way, the operation-administration-maintenance device OAM performs network optimization for notifying an operator of the discovered coverage problem or solving the discovered coverage problem. Alternatively, the base station eNB may use the received measurement data in configuration change for solving the coverage problem of the base station eNB without transferring the received measurement data to the operation-administration-maintenance device OAM.

Figure 2:
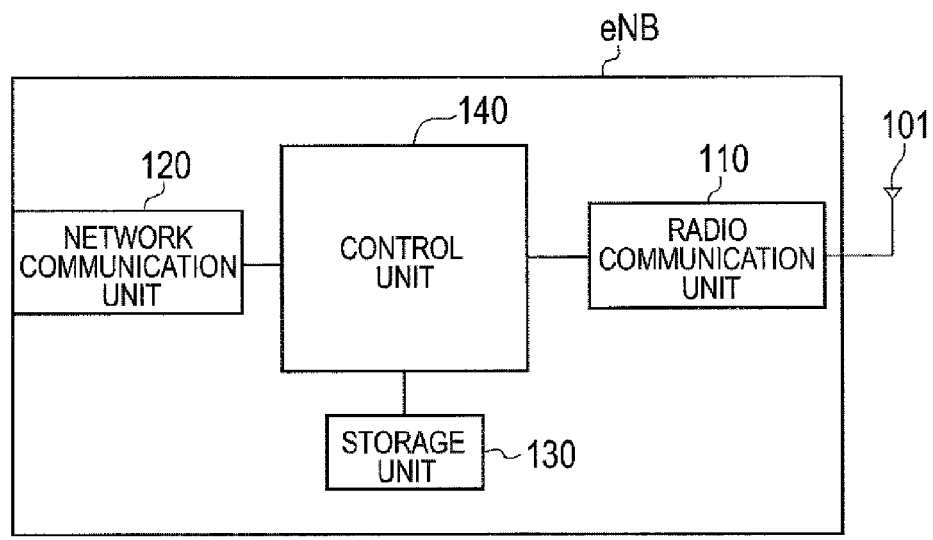
FIG. 2 is a block diagram illustrating a configuration of a base station eNB according to the first embodiment and the second embodiment.

FIG. 2 is a block diagram illustrating a configuration of the base station eNB according to the present embodiment.

As illustrated in FIG. 2, the base station eNB includes an antenna 101, a radio communication unit 110, a network communication unit 120, a storage unit 130, and a control unit 140.

The antenna 101 is used for transmitting and receiving a radio signal. The radio communication unit 110 is configured using a radio frequency (RF) circuit or a baseband (BB) circuit, and is configured to perform radio communication through the antenna 101, for example. For transmission, the radio communication unit 110 performs coding and modulation of a transmitted signal that is input from the control unit 140, performs up-converting and amplification for the modulated signal, and then outputs the amplified signal to the antenna 101. For reception, the radio communication unit 110 performs amplification and down-converting of a received signal that is input from the antenna 101, performs demodulation and decoding for the converted signal, and then outputs the decoded signal to the control unit 140.

The network communication unit 120 performs inter-base station communication with a neighboring base station by using an X2 interface illustrated in FIG. 1. Furthermore, the network communication unit 120 performs communication with a core network (specifically, the mobility management device MME, the gateway device S-GW, and operation-administration-maintenance device OAM) by using an S1 interface illustrated in FIG. 1. In the present embodiment, the operation-administration-maintenance device OAM corresponds to an upper device of the base station eNB.

The storage unit 130 is configured using a memory, for example, and stores various types of information that is used for control and the like of the base station eNB. The control unit 140 is configured using a CPU, for example, and controls various functions provided in the base station eNB. In the present embodiment, the control unit 140 controls the radio communication unit 110 to include the aforementioned measurement unnecessary area parameter into the Measurement Configuration and to transmit the Measurement Configuration to the radio terminal UE. As described above, in the present embodiment, the control unit 140 and the radio communication unit 110 constitute a transmit unit.

Figure 3:
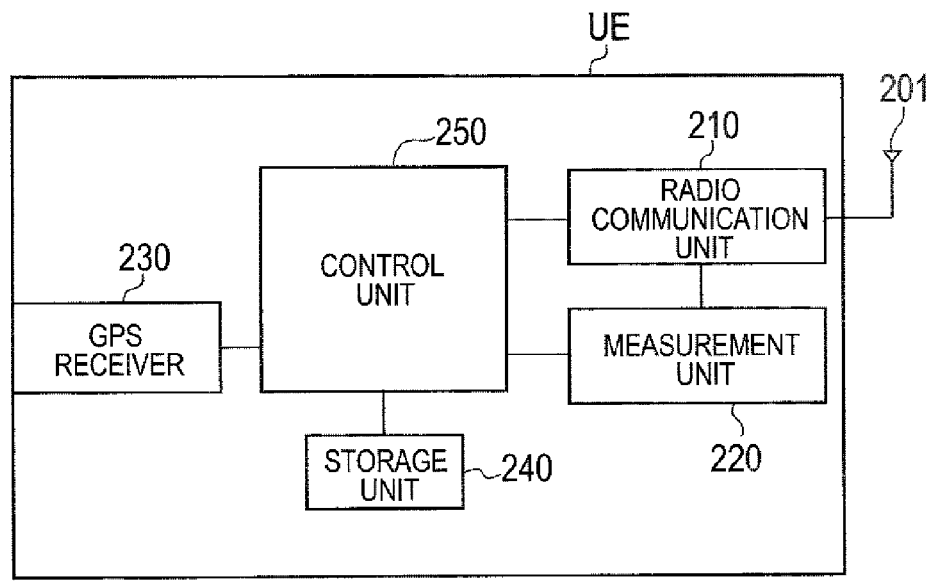
FIG. 3 is a block diagram illustrating a configuration of a radio terminal UE according to the first embodiment and the second embodiment.

FIG. 3 is a block diagram illustrating a configuration of the radio terminal UE according to the present embodiment. Hereinafter, an example, in which the radio terminal UE has a positioning function (a GPS function), will be described.

As illustrated in FIG. 3, the radio terminal UE includes an antenna 201, a radio communication unit 210, a measurement unit 220, a GPS receiver 230, a storage unit 240, and a control unit 250. Furthermore, the radio terminal UE may further include a user interface unit and a battery.

The antenna 201 is used for transmitting and receiving radio signals. The radio communication unit 210 is configured using a radio frequency (RF) circuit or a baseband (BB) circuit, for example, and is configured to perform radio communication through the antenna 201. For transmission, the radio communication unit 210 performs coding and modulation of a transmission signal input from the control unit 250, performs up-conversion and amplification, and then outputs the transmission signal to the antenna 201. For reception, the radio communication unit 210 performs amplification and down-conversion of a reception signal input from the antenna 201, performs demodulation and decoding, and outputs the reception signal to the control unit 250.

In the present embodiment, the radio communication unit 210 corresponds to a reception unit that receives the Measurement Configuration including the aforementioned measurement unnecessary area parameters.

The measurement unit 220 periodically measures a radio environment (RSRP/RSRQ) on the basis of a reference signal received in the radio communication unit 210 from the E-UTRAN 10, and outputs the measured radio environment to the control unit 250.

The GPS receiver 230 receives a signal from a GPS satellite and periodically outputs GPS location information to the control unit 250.

The storage unit 240 is configured using a memory, for example, and stores various types of information that is used for control and the like of the radio terminal UE. The control unit 250 is configured using a CPU, for example, and controls various functions provided in the radio terminal UE. The control unit 250 performs measurement of a radio environment according to each configuration parameter included in the Measurement Configuration received in the radio communication unit 210, and controls measurement data including a result of the measurement and location information at the time of the measurement to be reported to the E-UTRAN 10.

Hereinafter, a measurement collection method used in the mobile communication system 1 configured as above will be described.

Figure 4:
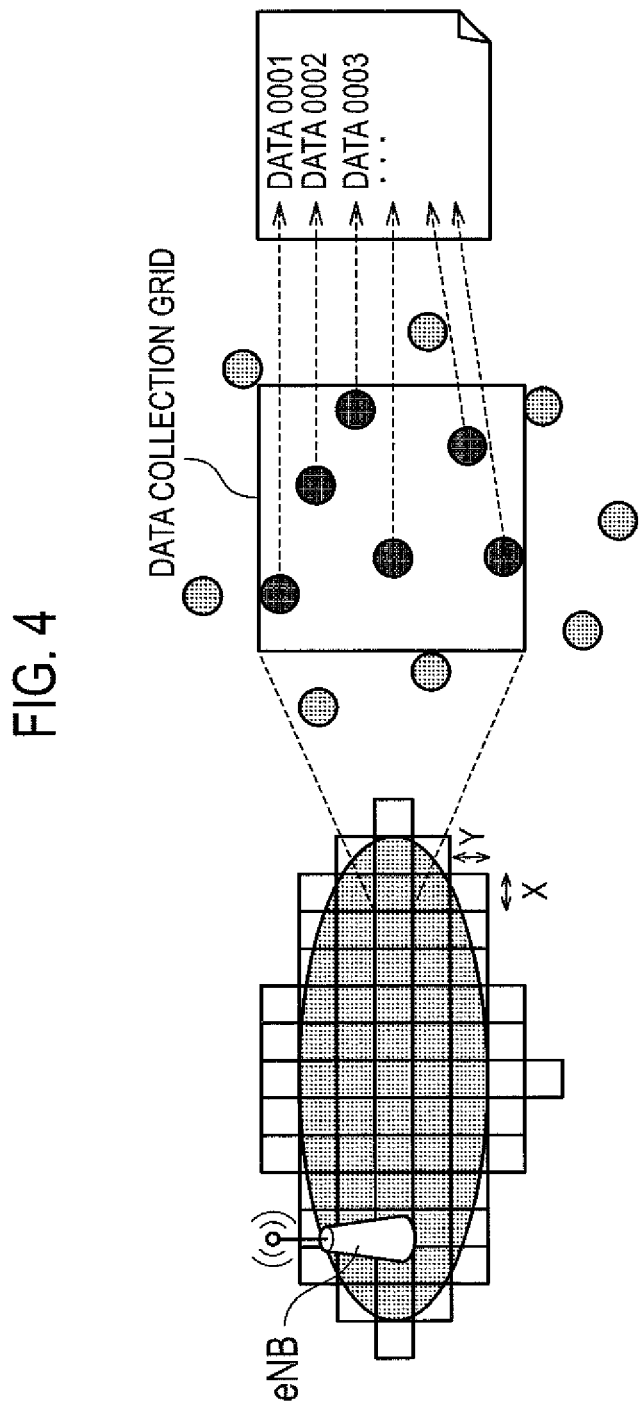
FIG. 4 is a diagram for explaining a determination process of a measurement unnecessary area according to the first embodiment and the second embodiment.

FIG. 4 is a diagram for explaining a process of determining a measurement unnecessary area.

As illustrated in FIG. 4, in the present embodiment, the storage unit 130 of the base station eNB stores measurement data for each of a service area of the base station eNB and a service area of a neighboring base station. The stored measurement data may be only measurement data reported from the radio terminal UE, or may be together with measurement data (a value obtained by inputting a measurement result based on a conventional drive test method from the core network via the network communication unit 120) acquired in a measurement vehicle.

Furthermore, the storage unit 130 of the base station eNB holds an area resolution variable set in advance. In the present embodiment, the area resolution variable illustrates an example in which the service area of the base station eNB and the service area of the neighboring base station are divided in a square shape as X[m] and Y[m]. However, the X value and Y value, for example, may be designated with a latitude and a longitude, or it may be possible to employ a method in which a distance and a radius from the base station eNB are designated and are divided in a circular shape.

The service area of the base station eNB and the service area of the neighboring base station are logically divided into a plurality of square data collection grids, in which (m*X, n*Y) and ((m+1)*X, (n+1)*Y) are employed as apexes, according to the area resolution variables X and Y in the state in which a current location of the base station eNB is set to the origin (0, 0). Furthermore, it is assumed that m and n are integral numbers and an upper limit value and a lower limit value thereof are separately set.

The control unit 140 of the base station eNB reads measurement data from the storage unit 130, and performs collection for measurement data corresponding to the range of each data collection grid. As a result of the data collection of each data collection grid, when a sufficient number of data is collected as data to be statistically processed in a certain period, the control unit 140 determines that further data collection is not necessary, and notifies the radio terminal UE of boundary information (a latitude, a longitude and the like) of an area, where no data collection is necessary, as the measurement unnecessary area parameter. Furthermore, a threshold value of a statistical processing period and the number of upper limit data are set in advance.

Figure 5:
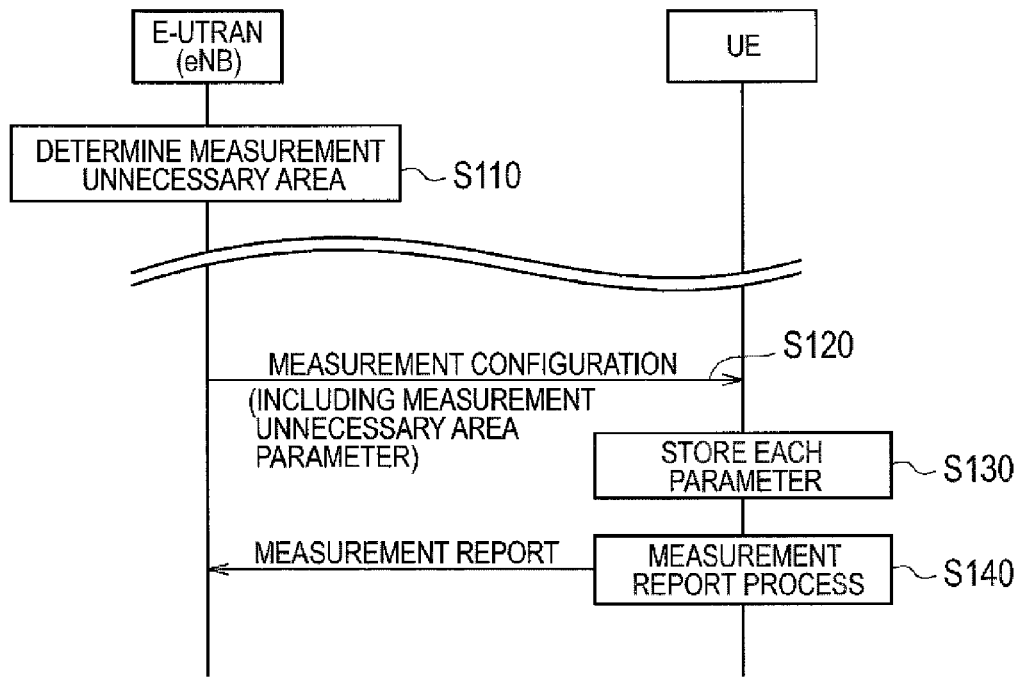
FIG. 5 is an operation sequence diagram of a mobile communication system according to the first embodiment.

FIG. 5 is an operation sequence diagram of the mobile communication system 1 according to the present embodiment.

As illustrated in FIG. 5, in step S110, the base station eNB determines a measurement unnecessary area by the aforementioned method. In addition, details of step S110 will be described later.

In step S120, the base station eNB includes a measurement unnecessary area parameter indicating the determined measurement unnecessary area into Measurement Configuration, and transmits the Measurement Configuration to a radio terminal UE in a connected state. Furthermore, the base station eNB also includes a report trigger parameter into the Measurement Configuration, and transmits the Measurement Configuration to the radio terminal UE in the connected state. The radio terminal UE receives the Measurement Configuration including a plurality of configuration parameters (the measurement unnecessary area parameter, the report trigger parameter and the like).

In step S130, the radio terminal UE stores the plurality of configuration parameters included in the received Measurement Configuration.

In step S140, the radio terminal UE performs measurement of a radio environment according to the plurality of configuration parameters stored in step S130, includes measurement data into Measurement Report, and transmits the Measurement Report to the base station eNB. In addition, details of step S140 will be described later.

Figure 6:
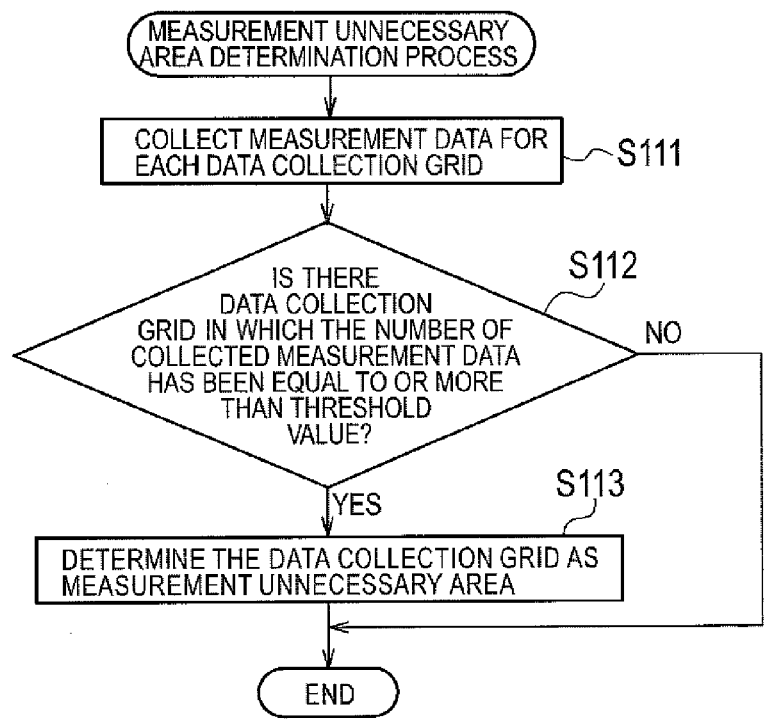
FIG. 6 is a flowchart illustrating details of step S120 of FIG. 5.

FIG. 6 is a flowchart illustrating details of step S110 of FIG. 5. The present flow is periodically performed by the base station eNB.

As illustrated in FIG. 6, in step S111, the control unit 140 of the base station eNB collects measurement data, and holds the measurement data in the storage unit 130 in each data collection grid (refer to FIG. 4).

In step S112, on the basis of the measurement data held in each data collection grid, the control unit 140 of the base station eNB determines whether there is a data collection grid in which the number of collected data has been equal to or more than a threshold value. Specifically, the control unit 140 compares the number of measurement data with the threshold value in each data collection grid, and determines whether there is a data collection grid in which the number of measurement data has been equal to or more than the threshold value.

When there is the data collection grid in which the number of measurement data was equal to or more than the threshold value (YES in step S112), the control unit 140 of the base station eNB determines the data collection grid, in which the number of measurement data has been equal to or more than the threshold value, as a measurement unnecessary area in step S113.

Figure 7:
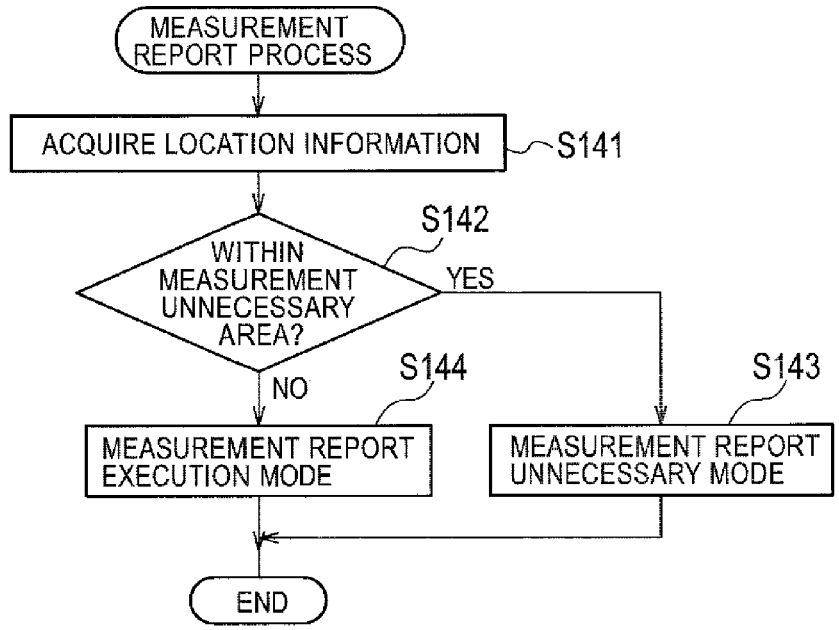
FIG. 7 is a flowchart illustrating details of step S140 of FIG. 5.

FIG. 7 is a flowchart illustrating details of step S140 of FIG. 5. The present flow is periodically performed by the radio terminal UE until the Immediate MDT is ended.

As illustrated in FIG. 7, in step S141, the control unit 250 of the radio terminal UE acquires location information generated using the GPS receiver 230. The location information indicates a current location of the radio terminal UE.

In step S142, the control unit 250 of the radio terminal UE determines whether the radio terminal UE exists in a measurement unnecessary area on the basis of the location information acquired in step S141 and the measurement unnecessary area parameter (boundary information) stored in the storage unit 130. Specifically, the control unit 250 determines whether a location (a longitude, a latitude and the like) indicated by the location information acquired in step S141 is in the range of an area boundary indicated by the measurement unnecessary area parameter stored in the storage unit 130.

When it is determined that the radio terminal UE exists in the measurement unnecessary area in step S142 (YES in step S142), the control unit 250 of the radio terminal UE shifts to a measurement report unnecessary mode in step S143. In the measurement report unnecessary mode, the control unit 250 generates measurement data including information on a result of measurement by the measurement unit 220 and the location information by the GPS receiver 230, and controls the measurement data not to be reported to the base station eNB even when a report condition designated by the report trigger parameter is satisfied. Alternatively, in the measurement report unnecessary mode, the control unit 250 may control the measurement by the measurement unit 220 to be stopped. In this way, the measurement data in the measurement unnecessary area is prevented from being reported to the base station eNB.

On the other hand, when it is determined that the radio terminal UE does not exist in the measurement unnecessary area in step S142 (NO in step S142), the control unit 250 of the radio terminal UE shifts to a measurement report execution mode in step S144. In the measurement report execution mode, the control unit 250 generates measurement data including the information on the result of the measurement by the measurement unit 220 and the location information by the GPS receiver 230, and controls the measurement data to be included in Measurement Report and to be transmitted to the base station eNB when the report condition designated by the report trigger parameter is satisfied.

As described above, according to the present embodiment, in the Immediate MDT, it is possible to provide that the measurement unnecessary area is designated at the network side and measurement data corresponding to the measurement unnecessary area is not reported from the radio terminal UE to the E-UTRAN 10, so that it is possible to prevent an operator from collecting unnecessary (unimportant) measurement data. Furthermore, the unimportant measurement data is prevented from being collected, so that it is possible to reduce the probability to cause inappropriate optimization.

First Modification of First Embodiment

In the aforementioned first embodiment, the measurement unnecessary area, which requires no measurement data, is designated from the network side to the radio terminal UE. However, in addition to the measurement unnecessary area, a measurement target area, which requires measurement data, may be designated. In the present modification, a measurement unnecessary area in the measurement target area is notified from the network side to the radio terminal UE. That is, the measurement target area is designated as an area having a range wider than that of the measurement unnecessary area, and for example, is designated in units of cells or tracking areas. In addition, the cell is a minimum unit of a service area and the tracking area is a unit of an area including a plurality of cells. Furthermore, a method of designating the measurement unnecessary area is not limited to the coordinate designation as described in the aforementioned first embodiment, and may be designation in units of cells.

Figure 8:
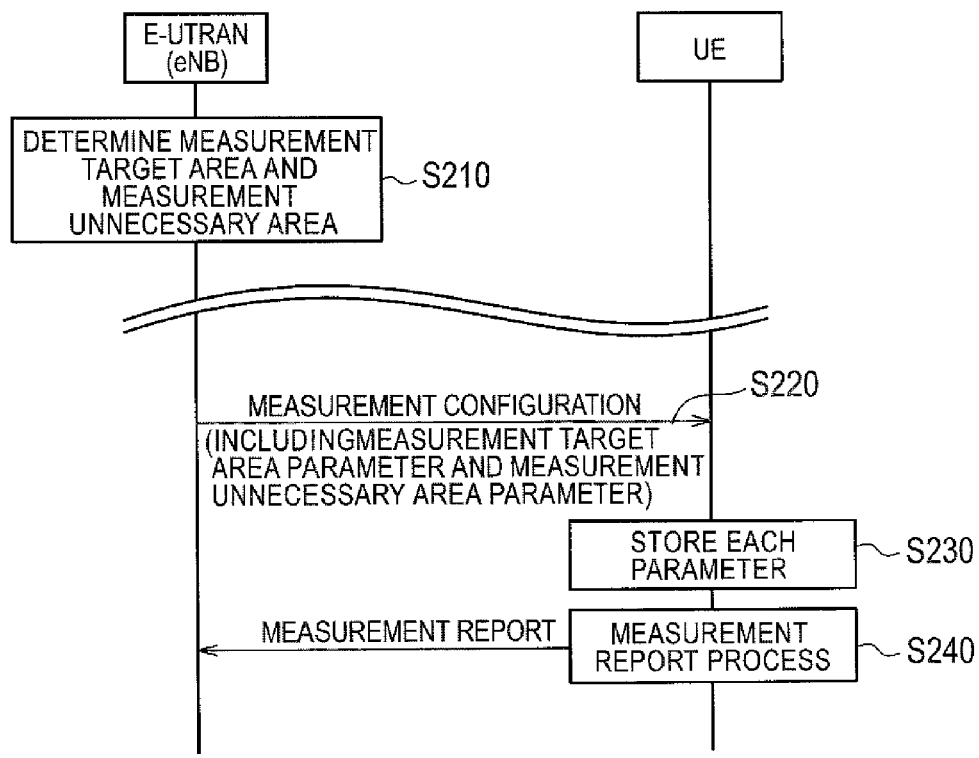
FIG. 8 is an operation sequence diagram of a mobile communication system according to a first modification of the first embodiment.

FIG. 8 is an operation sequence diagram of the mobile communication system 1 according to the present modification.

As illustrated in FIG. 8, in step S210, the base station eNB determines a measurement target area and a measurement unnecessary area. As a method of determining the measurement unnecessary area, similarly to the first embodiment, it is possible to employ a method in which an area including sufficiently collected measurement data is determined as the measurement unnecessary area. On the other hand, as a method of determining the measurement target area, it is possible to employ a method in which an area (a cell or a tracking area) including a small number of measurement data, that is, an area (a cell or a tracking area), where the number of measurement data is smaller than a threshold value, is determined as the measurement target area.

In step S220, the base station eNB includes a measurement target area parameter indicating the determined measurement target area and a measurement unnecessary area parameter indicating the determined measurement unnecessary area into Measurement Configuration, and transmits the Measurement Configuration to a radio terminal UE in a connected state. Furthermore, the base station eNB also includes a report trigger parameter into the Measurement Configuration, and transmits the Measurement Configuration to the radio terminal UE in the connected state. The radio terminal UE receives the Measurement Configuration including a plurality of configuration parameters (the measurement target area parameter, the measurement unnecessary area parameter, the report trigger parameter and the like).

In step S230, the radio terminal UE stores the plurality of configuration parameters included in the received Measurement Configuration.

In step S240, the radio terminal UE performs measurement of a radio environment according to the plurality of configuration parameters stored in step S230, includes measurement data into Measurement Report, and transmits the Measurement Report to the base station eNB.

Figure 9:
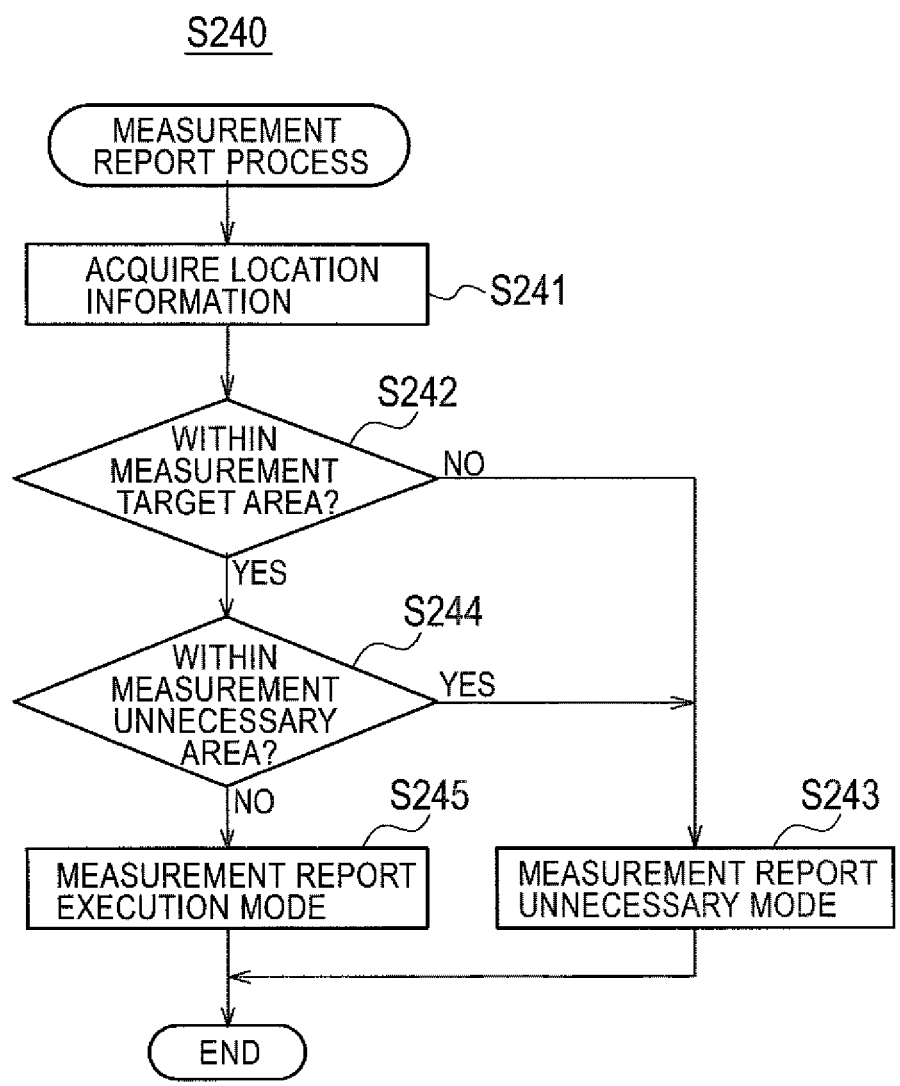
FIG. 9 is a flowchart illustrating details of step S240 of FIG. 8.

FIG. 9 is a flowchart illustrating details of step S240 of FIG. 8. The present flow is periodically performed by the radio terminal UE until the Immediate MDT is ended.

As illustrated in FIG. 9, in step S241, the control unit 250 of the radio terminal UE acquires location information. The location information, for example, includes information for designating a serving cell or information for designating a serving tracking area, in addition to location information (a longitude, a latitude and the like) obtained using the GPS receiver 230. In addition, the information for designating a serving cell or the information for designating a serving tracking area is acquirable from a reference signal or broadcast information from the E-UTRAN 10.

In step S242, the control unit 250 of the radio terminal UE determines whether the radio terminal UE exists in a measurement target area on the basis of the location information acquired in step S241 and the measurement target area parameter stored in the storage unit 130. Specifically, the control unit 250 determines whether a location (the serving cell or the serving tracking area) indicated by the location information acquired in step S241 is in the range of a measurement target cell or a measurement target tracking area indicated by the measurement target area parameter stored in the storage unit 130.

When it is determined that the radio terminal UE does not exist in the measurement target area in step S242 (NO in step S242), the control unit 250 of the radio terminal UE shifts to a measurement report unnecessary mode in step S243. An operation in the measurement report unnecessary mode is the same as the operation described in the first embodiment.

On the other hand, when it is determined that the radio terminal UE exists in the measurement target area in step S242 (YES in step S242), the control unit 250 of the radio terminal UE determines whether the radio terminal UE exists in a measurement unnecessary area on the basis of the location information acquired in step S241 and the measurement unnecessary area parameter (boundary information) stored in the storage unit 130 in step S244. Specifically, the control unit 250 determines whether the location (the longitude, the latitude and the like) indicated by the location information acquired in step S241 is in the range of an area boundary indicated by the measurement unnecessary area parameter stored in the storage unit 130.

When it is determined that the radio terminal UE exists in the measurement unnecessary area in step S244 (YES in step S244), the control unit 250 of the radio terminal UE shifts to a measurement report unnecessary mode in step S243.

On the other hand, when it is determined that the radio terminal UE does not exist in the measurement unnecessary area in step S244 (NO in step S244), the control unit 250 of the radio terminal UE shifts to a measurement report execution mode in step S245. An operation in the measurement report execution mode is the same as the operation described in the first embodiment.

As described above, according to the present modification, in the Immediate MDT, it is possible to provide that the measurement target area in addition to the measurement unnecessary area are designated at the network side and measurement data corresponding to the measurement unnecessary area is not reported from the radio terminal UE to the E-UTRAN 10, so that it is possible to prevent an operator from collecting unnecessary (unimportant) measurement data while collecting measurement data for a specific cell or tracking area.

Second Modification of First Embodiment

In the aforementioned first embodiment, the measurement unnecessary area is notified from the network side to the radio terminal UE through the coordinate designation regardless of whether the radio terminal UE has the GPS receiver 230. However, the measurement unnecessary area may be notified from the network side to the radio terminal UE through the coordinate designation after confirming that the radio terminal UE has the GPS receiver 230.

Figure 10:
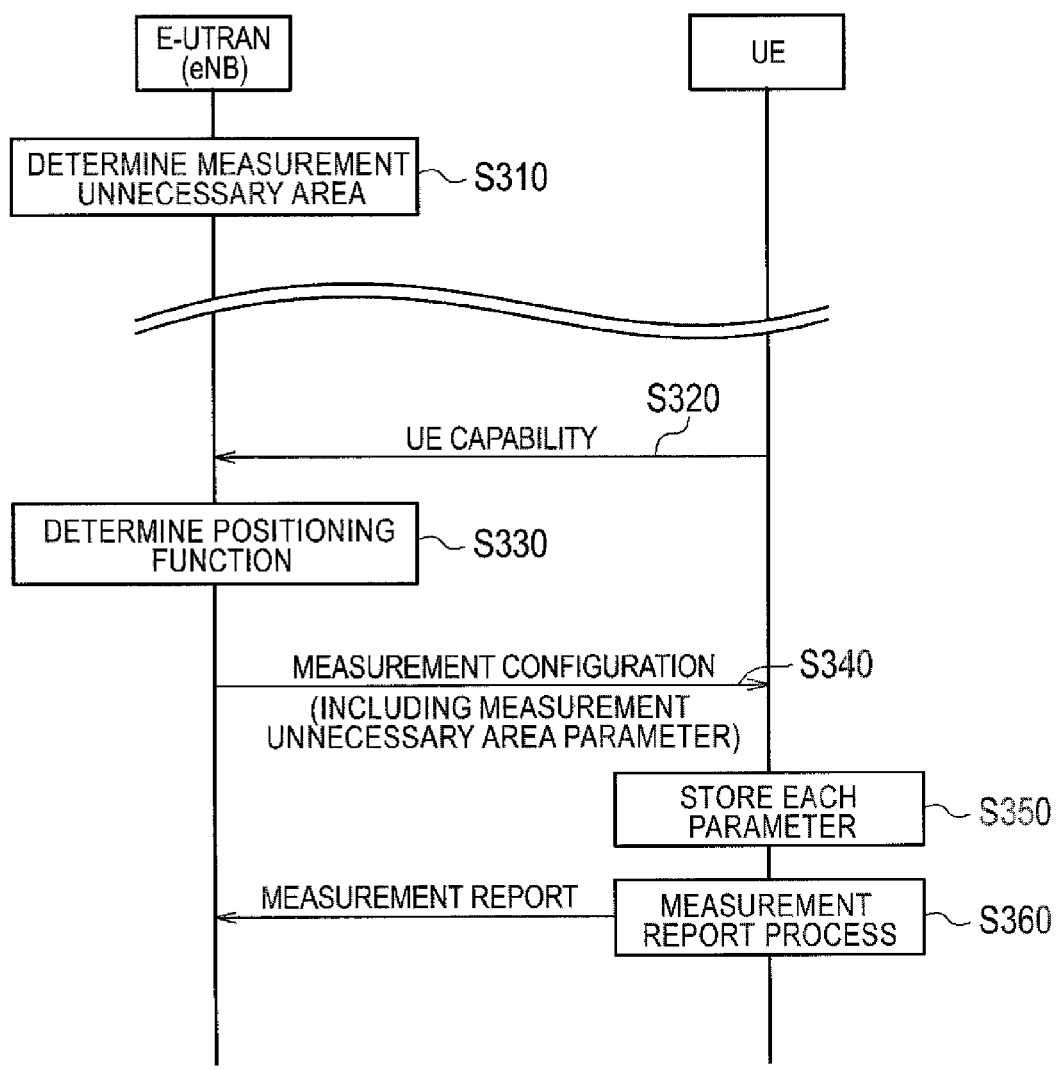
FIG. 10 is an operation sequence diagram of a mobile communication system according to a second modification of the first embodiment.

FIG. 10 is an operation sequence diagram of the mobile communication system 1 according to the present modification. In FIG. 10, since processes other than step S320 and step S330 are the same as the processes of the first embodiment, processes of step S320 and step S330 will be described below.

In step S320, the radio terminal UE in a connected state transmits, to the base station eNB, UE Capability that is a message including capability information indicating the capability of the radio terminal UE. The capability information includes information regarding whether the radio terminal UE has a positioning function (the GPS receiver 230). The base station eNB receives the UE Capability.

In step S330, on the basis of the received UE Capability, the base station eNB determines whether the radio terminal UE has the positioning function (the GPS receiver 230). Then, the base station eNB includes a measurement unnecessary area parameter of coordinate designation into Measurement Configuration and transmits the Measurement Configuration to the radio terminal UE only when it is determined that the radio terminal UE has the positioning function (the GPS receiver 230).

Second Embodiment

The aforementioned first embodiment described the method for designating the measurement unnecessary area in the Immediate MDT. However, in the present embodiment, a method for designating the measurement unnecessary area in Logged MDT will be described.

In the Logged MDT, the radio terminal UE in an idle state measures and records a radio environment from the E-UTRAN 10, and reports measurement data to the E-UTRAN 10 when the radio terminal UE shifts to a connected state from the idle state. Hereinafter, a process, in which the radio terminal UE appropriately generates and records the measurement data, will be referred to as "logging".

Since the configuration of the mobile communication system 1 is the same as that of the first embodiment, a measurement collection method according to the second embodiment will be described below.

Figure 11:
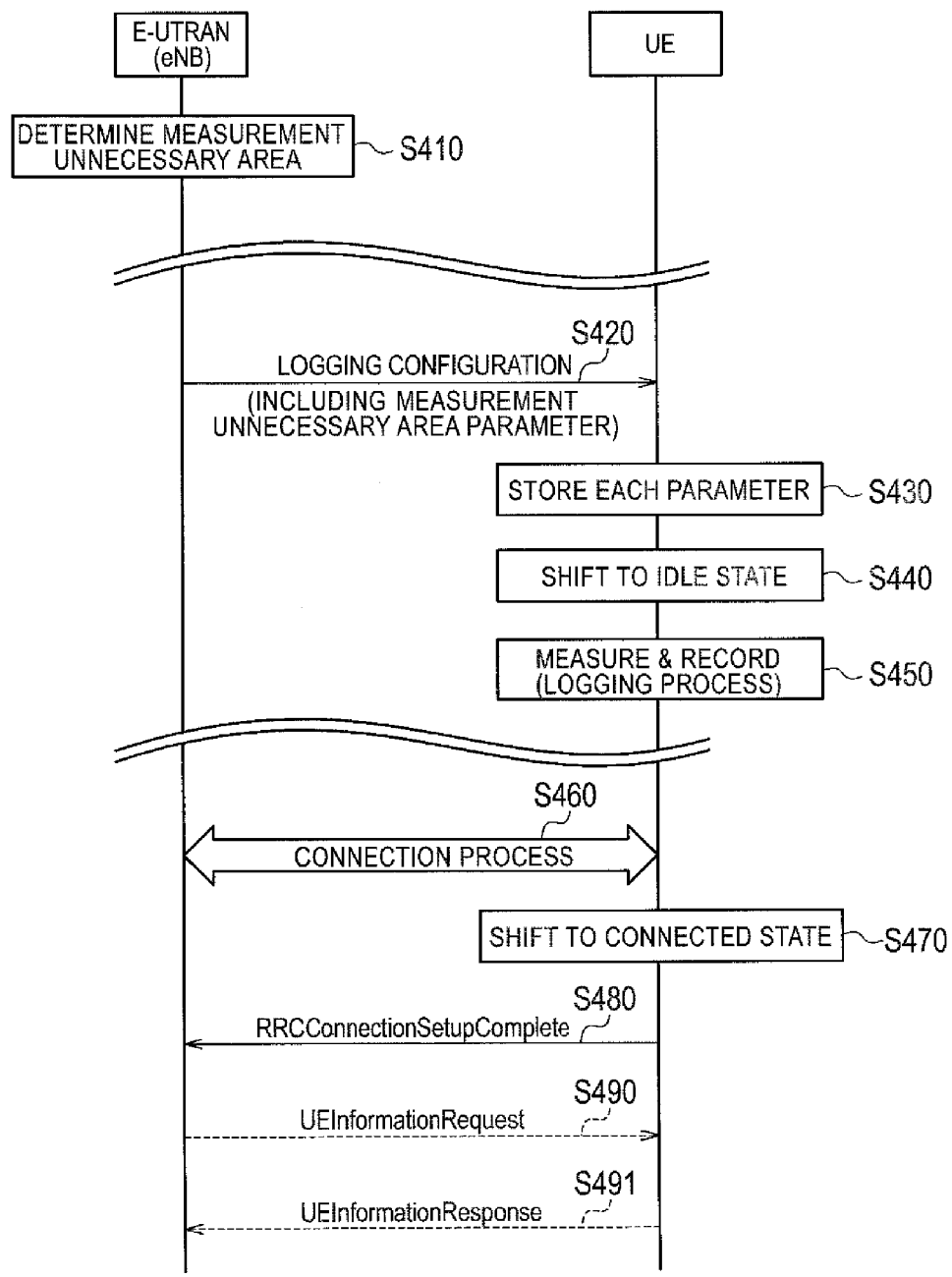
FIG. 11 is an operation sequence diagram of a mobile communication system according to the second embodiment.

FIG. 11 is an operation sequence diagram of the mobile communication system 1 according to the present embodiment.

As illustrated in FIG. 11, in step S410, the base station eNB determines a measurement unnecessary area. A method of determining the measurement unnecessary area is the same as that of the first embodiment.

In step S420, the base station eNB includes a measurement unnecessary area parameter indicating the determined measurement unnecessary area into Logging Configuration (a configuration message), and transmits the Logging Configuration to a radio terminal UE in a connected state. Furthermore, the base station eNB also includes a logging trigger parameter into the Logging Configuration, and transmits the Logging Configuration to the radio terminal UE in the connected state, wherein the logging trigger parameter is used to designate a condition (a trigger) in which logging is performed. The radio terminal UE receives the Logging Configuration including a plurality of configuration parameters (the measurement unnecessary area parameter, the logging trigger parameter and the like).

In step S430, the radio terminal UE stores the plurality of configuration parameters included in the received Logging Configuration.

In step S440, the radio terminal UE shifts to the idle state from the connected state.

In step S450, the radio terminal UE performs logging according to the plurality of configuration parameters stored in step S430. In addition, details of step S450 will be described later.

The radio terminal UE performs a connection process with the base station eNB in step S460, and shifts to the connected state from the idle state in step S470. In addition, the base station eNB performing the connection process may be different from the base station eNB at the time of the Logging Configuration.

In step S480, the radio terminal UE transmits, to the base station eNB, RRC Connection Setup Complete indicating the completion of the connection process with the base station eNB. Furthermore, the radio terminal UE includes information indicating the fact that measurement data has been recorded (held) into the RRC Connection Setup Complete, and transmits the RRC Connection Setup Complete to the base station eNB.

In step S490, when it is determined to acquire the measurement data held by the radio terminal UE, the base station eNB transmits UE Information Request for requesting a report of the measurement data to the radio terminal UE.

In step S491, the radio terminal UE transmits (reports) the held measurement data to the base station eNB in response to the UE Information Request received from the base station eNB.

Figure 12:
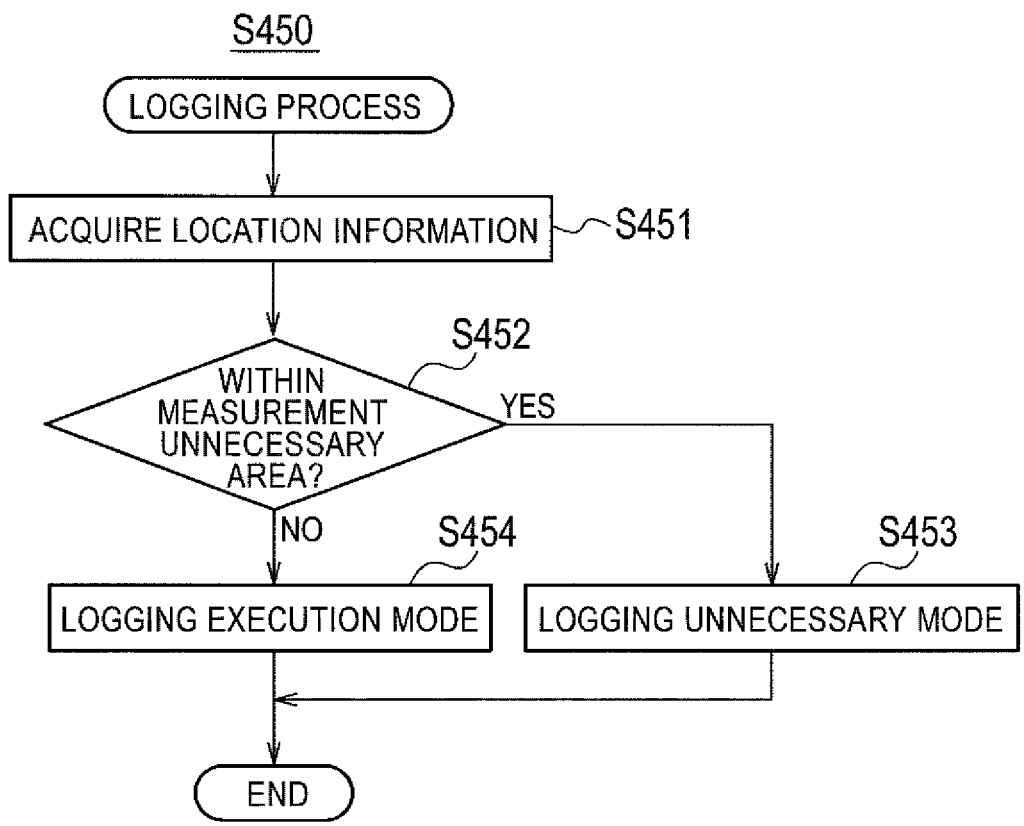
FIG. 12 is a flowchart illustrating details of step S450 of FIG. 11.

FIG. 12 is a flowchart illustrating details of step S450 of FIG. 11. The present flow is periodically performed by the radio terminal UE until the Logged MDT (logging) is ended.

As illustrated in FIG. 12, in step S451, the control unit 250 of the radio terminal UE acquires location information generated using the GPS receiver 230. The location information indicates a current location of the radio terminal UE.

In step S452, the control unit 250 of the radio terminal UE determines whether the radio terminal UE exists in a measurement unnecessary area on the basis of the location information acquired in step S451 and the measurement unnecessary area parameter (boundary information) stored in the storage unit 130. Specifically, the control unit 250 determines whether a location (a longitude, a latitude and the like) indicated by the location information acquired in step S451 is in the range of an area boundary indicated by the measurement unnecessary area parameter stored in the storage unit 130.

When it is determined that the radio terminal UE exists in the measurement unnecessary area in step S452 (YES in step S452), the control unit 250 of the radio terminal UE shifts to a logging unnecessary mode in step S453. In the logging unnecessary mode, the control unit 250 generates measurement data, and controls the measurement data not to be recorded in the storage unit 240 even when a logging condition designated by the logging trigger parameter is satisfied. Alternatively, in the logging unnecessary mode, the control unit 250 may control the generation of the measurement data to be stopped, or may control the measurement data to be stored in the storage unit 240 once and to be deleted. In this way, the measurement data in the measurement unnecessary area is prevented from being reported to the base station eNB.

On the other hand, when it is determined that the radio terminal UE does not exist in the measurement unnecessary area in step S452 (NO in step S452), the control unit 250 of the radio terminal UE shifts to a logging execution mode in step S454. In the logging execution mode, the control unit 250 generates measurement data including the information on the result of the measurement by the measurement unit 220, the location information by the GPS receiver 230, and a time stamp, and controls the measurement data to be recorded in the storage unit 240 when the logging condition designated by the logging trigger parameter is satisfied.

As described above, according to the present embodiment, in the Logged MDT, it is possible to provide that the measurement unnecessary area is designated at the network side and measurement data corresponding to the measurement unnecessary area is not reported to the E-UTRAN 10 from the radio terminal UE, so that it is possible to prevent an operator from collecting unnecessary (unimportant) measurement data. Furthermore, the unimportant measurement data is prevented from being collected, so that it is possible to reduce the probability to cause inappropriate optimization. Moreover, logging in the measurement unnecessary area is stopped, so that it is possible to reduce memory capacity and power consumption of the radio terminal UE.

First Modification of Second Embodiment

In the aforementioned second embodiment, the measurement unnecessary area, which requires no measurement data, is designated from the network side to the radio terminal UE. However, in addition to the measurement unnecessary area, a measurement target area, which requires measurement data, may be designated. In the present modification, a measurement unnecessary area in the measurement target area is notified from the network side to the radio terminal UE. That is, the measurement target area is designated as an area having a range wider than that of the measurement unnecessary area, and for example, is designated in units of cells or tracking areas. In addition, the cell is a minimum unit of a service area and the tracking area is a unit of an area including a plurality of cells. Furthermore, a method of designating the measurement unnecessary area is not limited to the coordinate designation as described in the aforementioned second embodiment, and may be designation in units of cells.

Figure 13:
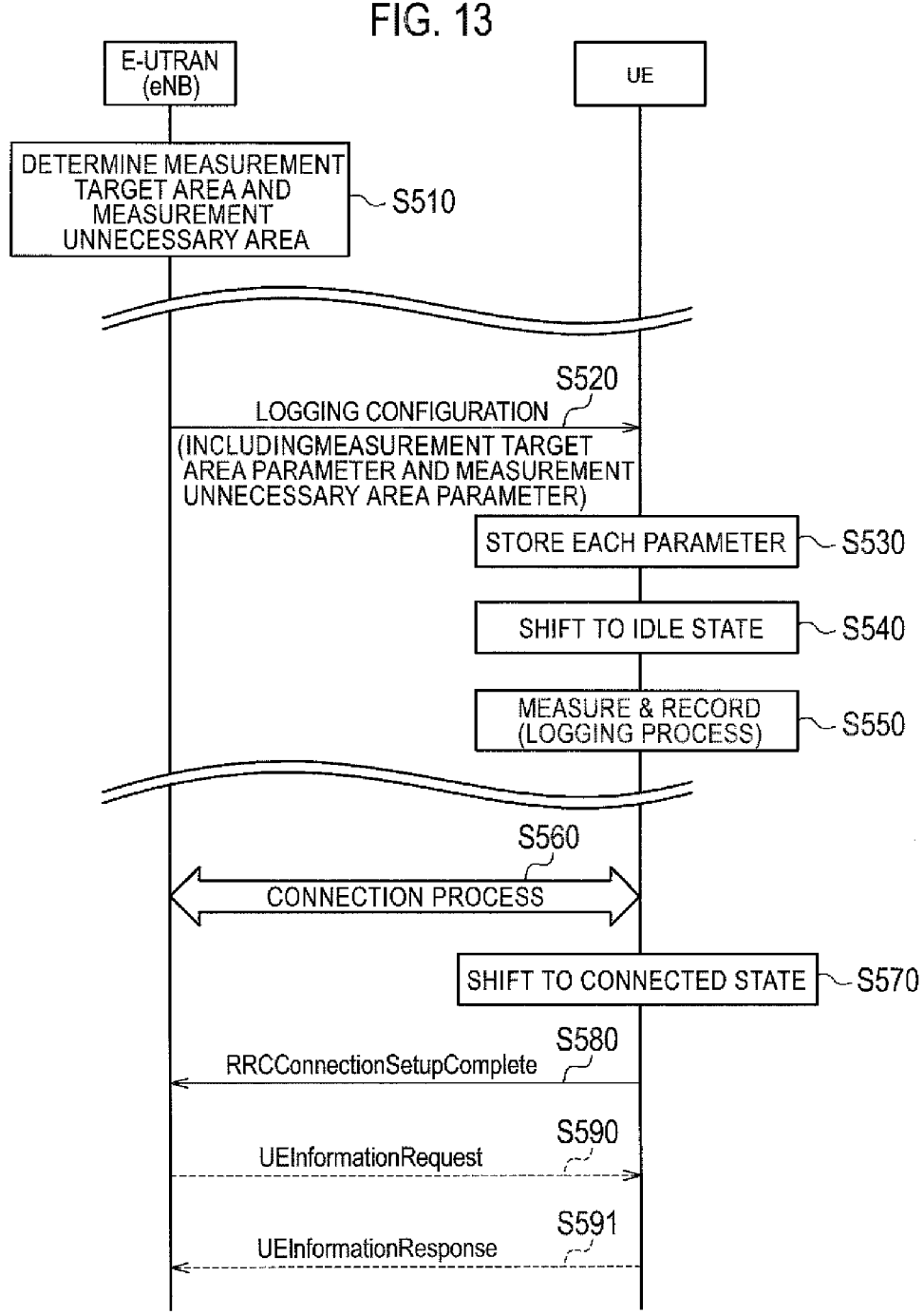
FIG. 13 is an operation sequence diagram of a mobile communication system according to a first modification of the second embodiment.

FIG. 13 is an operation sequence diagram of the mobile communication system 1 according to the present modification.

As illustrated in FIG. 13, in step S510, the base station eNB determines a measurement target area and a measurement unnecessary area. As a method of determining the measurement unnecessary area, similarly to the first embodiment, it is possible to employ a method in which an area including sufficiently collected measurement data is determined as the measurement unnecessary area. On the other hand, as a method of determining the measurement target area, it is possible to employ a method in which an area (a cell or a tracking area) including a small number of measurement data, that is, an area (a cell or a tracking area), where the number of measurement data is smaller than a threshold value, is determined as the measurement target area.

In step S520, the base station eNB includes a measurement target area parameter indicating the determined measurement target area and a measurement unnecessary area parameter indicating the determined measurement unnecessary area, into Logging Configuration, and transmits the Logging Configuration to the radio terminal UE in a connected state. Furthermore, the base station eNB also includes a logging trigger parameter into the Logging Configuration, and transmits the Logging Configuration to the radio terminal UE in the connected state. The radio terminal UE receives the Logging Configuration including a plurality of configuration parameters (the measurement target area parameter, the measurement unnecessary area parameter, the logging trigger parameter and the like).

In step S530, the radio terminal UE stores the plurality of configuration parameters included in the received Logging Configuration.

In step S540, the radio terminal UE shifts to an idle state from the connected state.

In step S550, the radio terminal UE performs logging according to the plurality of configuration parameters stored in step S530. In addition, details of step S550 will be described later. Furthermore, processes after step S560 are the same as the processes of the second embodiment.

Figure 14:
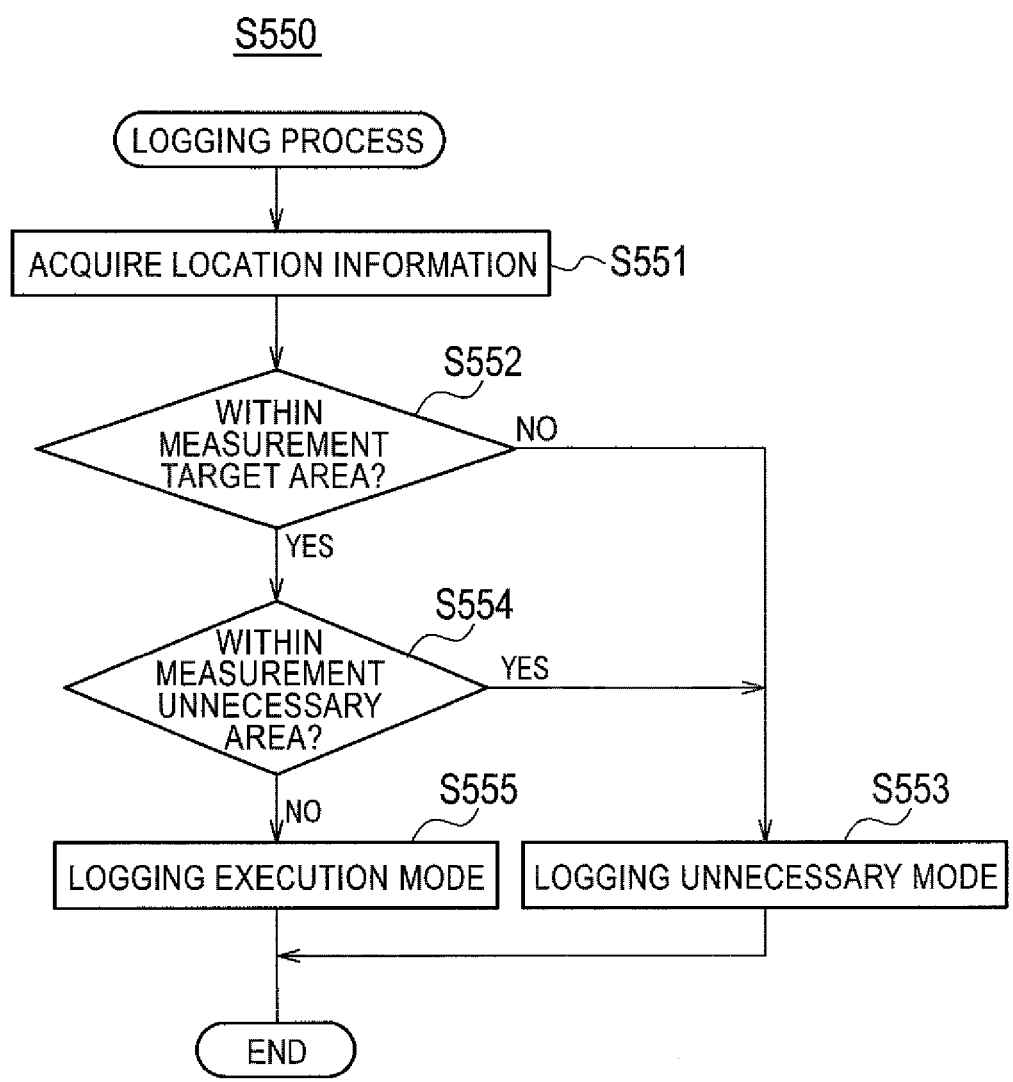
FIG. 14 is a flowchart illustrating details of step S550 of FIG. 13.

FIG. 14 is a flowchart illustrating details of step S550 of FIG. 13. The present flow is periodically performed by the radio terminal UE until the Logged MDT (logging) is ended.

As illustrated in FIG. 14, in step S551, the control unit 250 of the radio terminal UE acquires location information. The location information, for example, includes information for designating a serving cell or information for designating a serving tracking area, in addition to location information (a longitude, a latitude and the like) obtained using the GPS receiver 230. In addition, the information for designating a serving cell or the information for designating a serving tracking area is acquirable from a reference signal or broadcast information from the E-UTRAN 10.

In step S552, the control unit 250 of the radio terminal UE determines whether the radio terminal UE exists in a measurement target area on the basis of the location information acquired in step S551 and the measurement target area parameter stored in the storage unit 130. Specifically, the control unit 250 determines whether a location (the serving cell or the serving tracking area) indicated by the location information acquired in step S551 is in the range of a measurement target cell or a measurement target tracking area indicated by the measurement target area parameter stored in the storage unit 130.

When it is determined that the radio terminal UE does not exist in the measurement target area in step S552 (NO in step S552), the control unit 250 of the radio terminal UE shifts to a logging unnecessary mode in step S553. An operation in the logging unnecessary mode is the same as the operation described in the second embodiment.

On the other hand, when it is determined that the radio terminal UE exists in the measurement target area in step S552 (YES in step S552), the control unit 250 of the radio terminal UE determines whether the radio terminal UE exists in a measurement unnecessary area on the basis of the location information acquired in step S551 and the measurement unnecessary area parameter (boundary information) stored in the storage unit 130 in step S554. Specifically, the control unit 250 determines whether the location (the longitude, the latitude and the like) indicated by the location information acquired in step S551 is in the range of an area boundary indicated by the measurement unnecessary area parameter stored in the storage unit 130.

When it is determined that the radio terminal UE exists in the measurement unnecessary area in step S554 (YES in step S554), the control unit 250 of the radio terminal UE shifts to a logging unnecessary mode in step S553.

On the other hand, when it is determined that the radio terminal UE does not exist in the measurement unnecessary area in step S554 (NO in step S554), the control unit 250 of the radio terminal UE shifts to a logging execution mode in step S555. An operation in the logging execution mode is the same as the operation described in the second embodiment.

As described above, according to the present modification, in the Logged MDT, it is possible to provide that the measurement target area in addition to the measurement unnecessary area are designated at the network side and measurement data corresponding to the measurement unnecessary area in the measurement target area is not reported from the radio terminal UE to the E-UTRAN 10, so that it is possible to prevent an operator from collecting unnecessary (unimportant) measurement data while collecting measurement data for a specific cell or tracking area.

Second Modification of Second Embodiment

In the aforementioned second embodiment, the measurement unnecessary area is notified from the network side to the radio terminal UE through the coordinate designation regardless of whether the radio terminal UE has the GPS receiver 230. However, the measurement unnecessary area may be notified from the network side to the radio terminal UE through the coordinate designation after confirming that the radio terminal UE has the GPS receiver 230.

FIG. 15 is an operation sequence diagram of the mobile communication system 1 according to the present modification. In FIG. 15, since processes other than step S620 and step S630 are the same as the processes of the second embodiment, processes of step S620 and step S630 will be described below.

In step S620, the radio terminal UE in a connected state transmits, to the base station eNB, UE Capability that is a message including capability information indicating the capability of the radio terminal UE. The capability information includes information regarding whether the radio terminal UE has a positioning function (the GPS receiver 230). The base station eNB receives the UE Capability.

In step S630, on the basis of the received UE Capability, the base station eNB determines whether the radio terminal UE has the positioning function (the GPS receiver 230). Then, the base station eNB includes a measurement unnecessary area parameter of coordinate designation into Logging Configuration and transmits the Logging Configuration to the radio terminal UE only when it is determined that the radio terminal UE has the positioning function (the GPS receiver 230).

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

In the aforementioned each embodiment, the base station eNB determines the measurement unnecessary area on the basis of collected measurement data. However, the operation-administration-maintenance device OAM may collect measurement data, determine the measurement unnecessary area on the basis of the collected measurement data, and notify the base station eNB of the determined measurement unnecessary area.

The aforementioned each embodiment described an example in which the measurement unnecessary area set once is maintained. However, it may be possible to employ a configuration in which the measurement unnecessary area set once is able to be initialized. For example, when the restart of data collection is necessary, a data collection restart notification may be performed for the radio terminal UE. Alternatively, when the measurement unnecessary area is set, a duration (a timeout time) of the configuration may also be notified.

Thus, it should be understood that the present invention includes various embodiments that are not described herein.

In addition, the entire content of Japanese Patent Application No. 2011-092512 (filed on Apr. 18, 2011) is incorporated in the present specification by reference.

INDUSTRIAL APPLICABILITY

According to the present invention, it is possible to provide a measurement collection method, abase station, and a radio terminal, by which it is possible for a network to easily collect important measurement data in MDT.

The invention claimed is:

1. A measurement collection method used in a mobile communication system, comprising:
   a step of transmitting, by a base station, a configuration message including one or more parameters related to measurement of a radio environment to a radio terminal; and
   a step of performing, by the radio terminal, measurement of the radio environment according to the one or more parameters included in the configuration message received from the base station, and reporting measurement data including a result of the measurement and location information at the time of the measurement to a network including the base station, wherein
   the base station includes unnecessary area information, which indicates a measurement unnecessary area requiring no measurement data, into the configuration message as one of the one or more parameters, and transmits the configuration message, wherein the measurement unnecessary area is designated with a coordinate,
   the radio terminal excludes measurement data, which corresponds to the measurement unnecessary area indicated by the designated coordinate of the unnecessary area information as defined by the one of the one or more parameters of the configuration message, from a report object to the network, or stops measurement in the measurement unnecessary area and reports measurement data including a measurement result, other than that in the measurement unnecessary area, to the network,
   the base station includes target area information, which indicates a measurement target area requiring measurement data, into the configuration message as one of the one or more parameters, in addition to the unnecessary area information, and transmits the configuration message, the unnecessary area information indicates the measurement unnecessary area in the measurement target area, and the target area information designates an area having a range wider than that of the measurement unnecessary area.

2. The measurement collection method according to claim 1, further comprising:

a step of determining, by the base station or an upper device of the base station, the measurement unnecessary area on the basis of measurement data collected in the past.

3. The measurement collection method according to claim 1, wherein the base station transmits the configuration message to the radio terminal having a position function.

4. A base station of a mobile communication system, comprising:

a transmission unit that transmits a configuration message including one or more parameters related to measurement of a radio environment to a radio terminal, wherein the transmission unit includes:

unnecessary area information into the configuration message as one of the one or more parameters, and transmits the configuration message, the unnecessary area information indicating a measurement unnecessary area requiring no measurement data including a result of measurement and location information at the time of the measurement, wherein the measurement unnecessary area is designated with a coordinate, target area information, which indicates a measurement target area requiring measurement data, into the configuration message as one of the one or more parameters, in addition to the unnecessary area information, and transmits the configuration message, the unnecessary area information indicates the measurement unnecessary area in the measurement target area according to the designated coordinate of the unnecessary area information as defined by the one of the one or more parameters of the configuration message, and the target area information designates an area having a range wider than that of the measurement unnecessary area.

5. A radio terminal of a mobile communication system, comprising:

a reception unit that receives a configuration message including one or more parameters related to measurement of a radio environment from a base station; and a control unit that controls so that the radio environment is measured according to the one or more parameters included in the configuration message received in the reception unit, and measurement data including a result of the measurement and location information at the time of the measurement is reported to a network including the base station, wherein the one or more parameters includes:

unnecessary area information indicating a measurement unnecessary area requiring no measurement data wherein the measurement unnecessary area is designated with a coordinate, and target area information, which indicates a measurement target area requiring measurement data, into the configuration message as one of the one or more parameters, in addition to the unnecessary area information, wherein the unnecessary area information indicates the measurement unnecessary area in the measurement target area, and the target area information designates an area having a range wider than that of the measurement unnecessary area, and the control unit controls so that measurement data, which corresponds to the measurement unnecessary area indicated by the designated coordinate of the unnecessary area information as defined by the one or more parameters of the configuration message, is excluded from a report object to the network, or controls so that measurement is stopped in the measurement unnecessary area and measurement data including a measurement result, other than that in the measurement unnecessary area, is reported to the network.

\* \* \* \* \*